United States Patent
Kikuta et al.

(10) Patent No.: US 6,946,811 B2
(45) Date of Patent: Sep. 20, 2005

(54) ENTRAPMENT DETECTING DEVICE FOR AN OPENING/CLOSING MEMBER

(75) Inventors: Takashi Kikuta, Kariya (JP); Kentaroh Hirose, Yokkaichi (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 73 days.

(21) Appl. No.: 10/448,348

(22) Filed: May 30, 2003

(65) Prior Publication Data

US 2004/0008001 A1 Jan. 15, 2004

(30) Foreign Application Priority Data

May 31, 2002 (JP) .................................. 2002-158827

(51) Int. Cl.$^7$ .................... E05F 15/02; E05F 15/10; H02P 7/00
(52) U.S. Cl. .................... 318/468; 318/445; 318/282; 49/26; 49/28
(58) Field of Search .................... 318/445, 449, 318/450, 468, 469, 120, 366, 256, 264, 265, 282, 286; 49/26, 28, 141, 192

(56) References Cited

U.S. PATENT DOCUMENTS

| | | | | |
|---|---|---|---|---|
| 4,561,691 A | * | 12/1985 | Kawai et al. ............... | 318/484 |
| 5,351,439 A | * | 10/1994 | Takeda et al. .................. | 49/28 |
| 5,530,329 A | * | 6/1996 | Shigematsu et al. ......... | 318/469 |
| 5,610,484 A | * | 3/1997 | Georgin ....................... | 318/286 |
| 6,297,609 B1 | * | 10/2001 | Takahashi et al. .......... | 318/484 |
| 6,320,342 B1 | * | 11/2001 | Yoshioka et al. ........... | 318/467 |
| 6,456,027 B1 | | 9/2002 | Pruessel | |
| 6,580,242 B2 | * | 6/2003 | Hirose et al. ............... | 318/445 |
| 6,590,357 B2 | * | 7/2003 | Okamoto ..................... | 318/467 |
| 6,617,812 B2 | * | 9/2003 | Nagashima et al. ........ | 318/280 |
| 2002/0093301 A1 | * | 7/2002 | Itami et al. .................. | 318/452 |
| 2003/0122516 A1 | * | 7/2003 | Mukai et al. ................ | 318/468 |

FOREIGN PATENT DOCUMENTS

| | | |
|---|---|---|
| CN | 1 451 561 A | 10/2003 |
| DE | 33 03 590 A1 | 8/1984 |
| DE | 199 08 658 A1 | 8/2000 |

* cited by examiner

Primary Examiner—Marlon T. Fletcher
Assistant Examiner—Eduardo Colon Santana
(74) Attorney, Agent, or Firm—Burns, Doane, Swecker & Mathis LLP

(57) ABSTRACT

An entrapment detecting device for an opening/closing member includes a controller which memorizes a driving condition of a driving unit corresponding to load applied to the opening/closing member as a reference load data when a predetermined condition is satisfied during the movement of the opening/closing member for closing. The controller further calculates a driving data representing the driving condition during the movement of the opening/closing member for closing after memorizing the reference load data, and an abnormality detecting data generated by eliminating the load during the predetermined condition being satisfied from the driving data based upon the driving data and the reference load data, and the controller judges an entrapment based upon the abnormality detecting data.

16 Claims, 4 Drawing Sheets

ENTRAPMENT DETECTING DEVICE FOR AN OPENING/CLOSING MEMBER

CROSS REFERENCE TO RELATED APPLICATIONS

This application is based on and claims priority under 35 U.S.C. §119 with respect to a Japanese Patent Application 2002-158827, filed on May 31, 2002, the entire content of which is incorporated herein by reference.

FIELD OF THE INVENTION

This invention generally relates to an entrapment detecting device for detecting entrapment of an object or an obstacle between a fixed member and an opening/closing member such as a vehicle sunroof, power window, slide door, and the like.

BACKGROUND OF THE INVENTION

A conventionally known type of entrapment detecting device is provided with a Hall IC (i.e. a rotation detecting sensor) for detecting variation of magnetic force of a magnet provided on a rotary shaft of a motor, thereby determining whether or not an object or an obstacle has been entrapped. More particularly, in the entrapment detecting device, the entrapment determination is performed by detecting a position of the magnet based upon the counted number of edges of a pulse signal outputted from the rotation detecting sensor, by calculating a rotational speed of the motor based upon cycles of the pulse signal, and by obtaining how much the rotational speed of the motor was decreased.

When an opening/closing member, such as a sunroof, or a power window, operates for opening or closing an open area, no constant load is applied to the opening/closing member within the open area. For example, there has been a sunroof apparatus for a vehicle, which is provided with a wind deflector (hereinafter, referred to as a deflector) for restraining hissing or pulsating wind sound which may occur while the vehicle is running with a roof opened. When the sunroof (i.e. the opening/closing member) operates for closing the open area, the sunroof is required to tilt down arm portions of the deflector so as to house the deflector in the vehicle roof. The deflector generally upstands being applied with reaction force of a spring. Therefore, the load applied to the opening/closing member upon tilting down the deflector is greater than load applied to the opening/closing member within a range in which the deflector is not required to be tilted down (hereinafter, referred to as a normal range), wherein load applied to the motor is increased and the motor rotational speed is hence decreased.

In the above-disclosed sunroof apparatus for a vehicle, it may not be accurately judged whether the decrease of the motor rotational speed has occurred due to the tilting-down operation of the deflector by the opening/closing member or due to the entrapment of the object or the obstacle between the opening/closing member and the fixed member. Therefore, a judging unit of the sunroof apparatus may judge that the entrapment has occurred when the deflector is tilted down by the opening/closing member with no entrapment therebetween. In such a case, the movement of the opening/closing member to close the open area may be erroneously stopped and the opening/closing member may be further erroneously moved in a reverse direction for opening the open area.

In order to prevent the above-described erroneous operation of the opening/closing member due to the misjudgment of the entrapment, recent developments have lead to an entrapment detecting device, in which a predetermined operational area, in which the motor rotational speed is changed based upon slidable movement of the opening/closing member, is divided into plural ranges, and a threshold value for determining the occurrence of the entrapment is preset in each range. The threshold value is denoted with the rotational speed. The judging unit of the entrapment detecting device determines the occurrence of the entrapment when the decreasing amount of the motor rotational speed per unit of time becomes greater than the threshold value. One of the plural ranges of the operational area is a range in which the deflector is tilted down by the sunroof. The threshold value in this range is preset at a relatively high value, i.e. at a relatively great decreasing amount of the motor rotational speed so as to prevent the misjudgment of the entrapment. In this case, when the motor rotational speed is decreased with no entrapment, the decreasing amount of the motor rotational speed does not exceed the threshold value, thereby capable of preventing the misjudgment of the entrapment, i.e. capable of preventing the erroneous operation of the opening/closing member.

Further, sliding resistance of the sunroof may vary due to fluctuation of the motor rotational speed due to temperature change, aging distortion of the sunroof, or the like. The threshold value for detecting the occurrence of the entrapment is required to be preset at a relatively high value considering various factors of the fluctuation of the motor rotational speed. Still further, pushed-down portions of the deflectors may be assembled with individual differences. The plural ranges with the relatively highly preset threshold value are preferably required to cross widely over the operational area to a certain degree. In such a case, considering the ranges in which the deflector is not tilted down by the opening/closing member and the motor rotational speed is not decreased, the threshold value in these ranges may be set at a relatively high value. Therefore, when the entrapment occurs without tilting-down the deflector in these ranges, the load applied to the object or the obstacle may become greater than the load applied to the object or the obstacle within the normal range. This may lead to damage on the object or the obstacle.

The above-described problem occurs due to the fluctuation of the load applied to the opening/closing member when the opening/closing member is moved for closing the operational area with no entrapment between the opening/closing member and the fixed member. Therefore, the present invention seeks to provide an improved entrapment detecting device for an opening/closing member capable of detecting entrapment independently of the fluctuation of the load applied to the opening/closing member when the opening/closing member is moved for closing the operational area with no entrapment between the opening/closing member and the fixed member.

SUMMARY OF THE INVENTION

According to an aspect of the present invention, an entrapment detecting device for an opening/closing member includes a driving means for driving an opening/closing member so as to be moved for opening/closing an opening defined in a fixed member, and a controlling means for detecting an object entrapped between the fixed member and the opening/closing member based upon a driving condition of the driving means while the opening/closing member is moved for closing the opening.

The controlling means memorizes the driving condition of the driving means corresponding to load applied to the opening/closing member as a reference load data when a predetermined condition is satisfied during the movement of the opening/closing member for closing the opening. The controlling means further calculates a driving data representing the driving condition of the driving means during the movement of the opening/closing member for closing the opening after memorizing the reference load data, and an abnormality detecting data generated by eliminating the load during the predetermined condition being satisfied from the driving data based upon the driving data and the reference load data. The controlling means judges whether or not the object is entrapped between the opening/closing member and the fixed member based upon the abnormality detecting data.

According to another aspect of the present invention, the controlling means recognizes an occurrence of the entrapment between the opening/closing member and the fixed member when a variation of the abnormality detecting data per predetermined passage of time exceeds a threshold value.

Alternatively, the controlling means can recognize an occurrence of the entrapment between the opening/closing member and the fixed member when a variation of the abnormality detecting data from a reference value exceeds a threshold value.

Still alternatively, the controlling means recognizes an occurrence of the entrapment between the opening/closing member and the fixed member when the abnormality detecting data exceeds a predetermined value.

According to another aspect of the present invention, the predetermined condition is satisfied when the controlling means judges that there is no object entrapped between the opening/closing member and the fixed member.

Further, the predetermined condition is satisfied when the driving of the driving means is not stopped while the opening/closing member is moved for closing the opening.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

An embodiment of the present invention will be described hereinbelow in detail with reference to the accompanying drawings. An entrapment detecting device according to the embodiment of the present invention is applied for a vehicle sunroof apparatus. However, the entrapment detecting device of the present invention is not limited only to the embodiment and can be applied for a vehicle window regulating device for moving up and down a window pane, a vehicle door opening/closing device for slidably moving a slide door, a vehicle roof opening/closing device capable of moving an entire vehicle roof, or the like.

Figure 1:
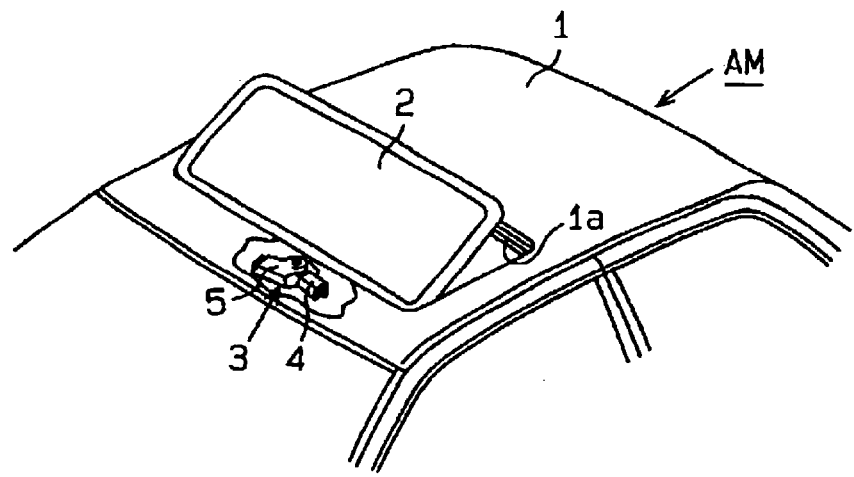
FIG. 1 is a schematic view illustrating a sunroof opening/closing device according to an embodiment of the present invention, in which a sunroof is under a tilted-up condition.

As illustrated in FIG. 1, a sunroof (i.e. a roof pane, an opening/closing member) 2 of a sunroof opening/closing device provided at a roof 1 for an automobile AM is moved for opening/closing an opening 1a defined in the roof 1. The sunroof 2 is slidably moved in a vehicle longitudinal direction by means of a known sliding mechanism (not shown) and is further tilted up and down by means of a known tilting mechanism (not shown). A driving unit (i.e. a driving means) 3 for operating the sunroof 2 is disposed in the roof 1 at a front-side portion of the opening 1a. The driving unit 3 is provided with an electrically-driven motor (hereinafter, referred to as a motor) 4, and a gear unit 5 as a single unit. An output shaft of the gear unit 5 is operatively connected to the sliding mechanism and the tilting mechanism. The sunroof 2 is tilted up and down between a tilted-up position illustrated in FIG. 1 and an entirely closed position in response to driving the motor 4 and is further slidably moved between the entirely closed position and an entirely open position illustrated in FIG. 2 in response thereto. According to the embodiment of the present invention, the sunroof 2 is tilted down from the tilted up position illustrated in FIG. 1 and is moved to close the opening 1a when the motor 4 is electrically rotated in a normal direction. On the other hand, the sunroof 2 is moved to open the opening 1a from the entirely closed position and is tilted up when the motor 4 is electrically rotated in a reverse direction.

Figure 2:
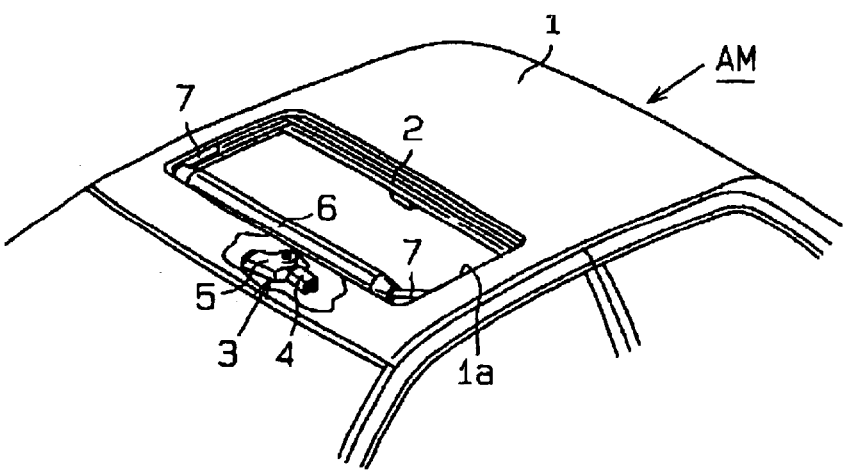
FIG. 2 is a perspective view illustrating the sunroof under an entirely open position.
Figure 3:
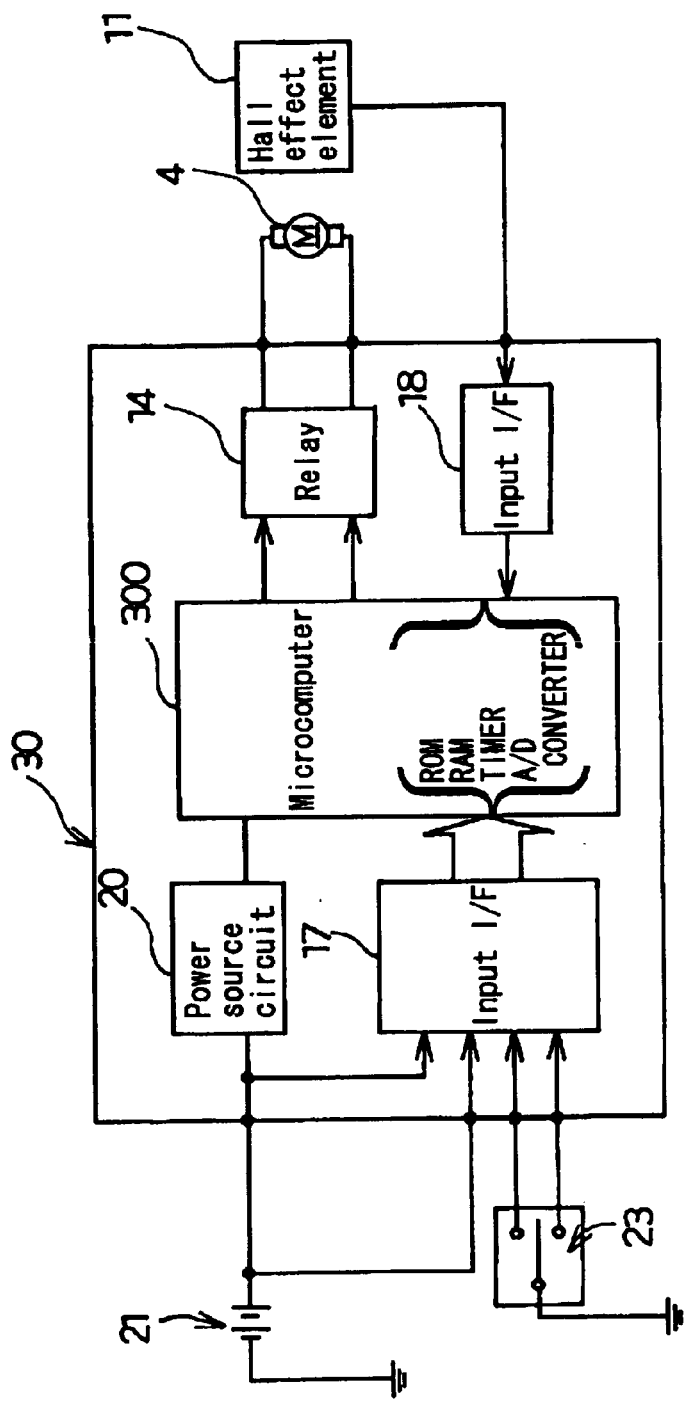
FIG. 3 is a block view illustrating a controller for controlling an opening/closing operation of the sunroof.

As illustrated in FIG. 2, a window deflector (hereinafter, referred to as a deflector) 6 is disposed at an inner-front portion of the opening 1a. The deflector 6 is supported by a pair of arms 7 during being applied with a biasing force of a spring (not shown) to upstand from the opening 1a in a vehicle upper direction. When the sunroof 2 is moved to open the opening 1a, the deflector 6 upstands by the biasing force of the spring. On the other hand, when the sunroof 2 is moved to close the opening 1a, the pair of arms 7 are pushed down by the sunroof 2 against the biasing force of the spring so that the deflector 6 is housed in the roof 1. As illustrated in FIG. 3, a controller (i.e. a controlling means) 30 of the gear unit 3 houses a microcomputer 300 possessing a read-only memory (i.e. a ROM), in which a program for controlling the driving of the motor 4 is stored, a random-access memory (i.e. a RAM), in which values necessary for program processes are stored, a timer for counting cycles of the pulse signal outputted from a Hall effect element (i.e. a pulse generating means) 11, and an A/D converter for converting an analog value, representing battery voltage as electric power source voltage inputted from an in-vehicle battery 21 as an electric power source, to a digital value, an input interface (i.e. an input I/F) 17 for achieving an electric compatibility between the microcomputer 300 and inputted signals, a relay 14 for controlling a rotational direction of the motor 4 to be the normal direction or the reverse direction, and a power source circuit 20 supplied with the electric power source (generally, 12 voltages) from the in-vehicle battery 21 and capable of generating a constant value (e.g., 5 voltages). The constant voltage generated by the power source circuit 20 is applied to the microcomputer 300 and the battery voltage is applied to the input I/F 17. When the motor 4 is driven in the normal direction, the sunroof 2 is moved to open the opening 1a. On the other hand, when the motor 4 is driven in the reverse direction, the sunroof 2 is moved to close the opening 1a.

An operation switch 23 is set inside of the vehicle and is manually operated by an occupant for opening/closing the sunroof 2. An open/down SW and a close/up SW of the operation switch 23 are operated in response to the operational direction thereof. Both of the switches are turned off when there is no operation applied to the operation switch 23. The signal from the operation switch 23 is inputted to the microcomputer 300 via the input I/F 17 and the microcomputer 300 outputs a driving signal for driving the motor 4 to the relay 14 based upon the signal from the operation switch 23. Therefore, the relay 14 is controlled to be supplied with electric current or not based upon the driving signal from the microcomputer 300, whereby the rotation of the motor 4 is controlled to be the normal direction, the reverse direction or to be stopped.

The pulse signal from the Hall effect element 11 is inputted to the microcomputer 300 via an input interface (i.e. an input I/F) 18. The Hall effect element 11 outputs one pulse per one rotation of a magnet (not shown) provided on a rotary shaft of the motor 4. The Hall effect element 11 therefore outputs the pulse signal which is repeatedly turned on and off in sync with the rotation of the motor 4. The microcomputer 300 detects pulse edges (hereinafter, referred as edges) of the pulse signal outputted from the Hall effect element 11, calculates respective time intervals between plural edges by the timer, obtains the cycles of the pulse signal, and calculates the rotational number of the motor 4. The microcomputer 300 judges, whether or not an object or an obstacle is entrapped between the roof 1 and the sunroof 2 slidably moving in the closing operation for closing the opening 1a, based upon the variation of the rotational number of the motor 4. That is, the microcomputer 300 determines the occurrence of the entrapment when the rotation of the motor 4 is inhibited, and the rotational number thereof is decreased.

Figure 4:
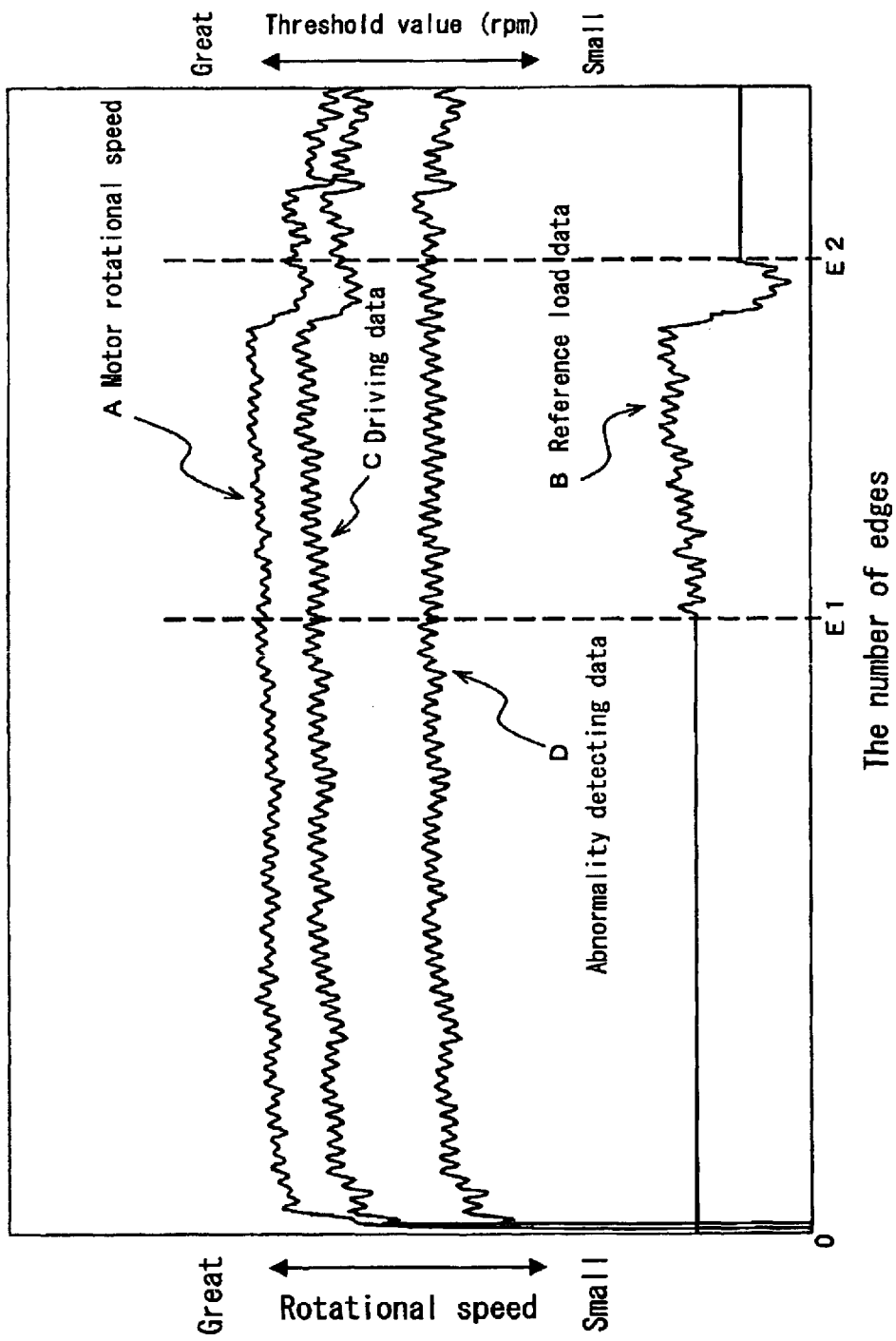
FIG. 4 is a graph illustrating each waveform of a reference load data, a driving data, and an abnormality detecting data.
Figure 5:
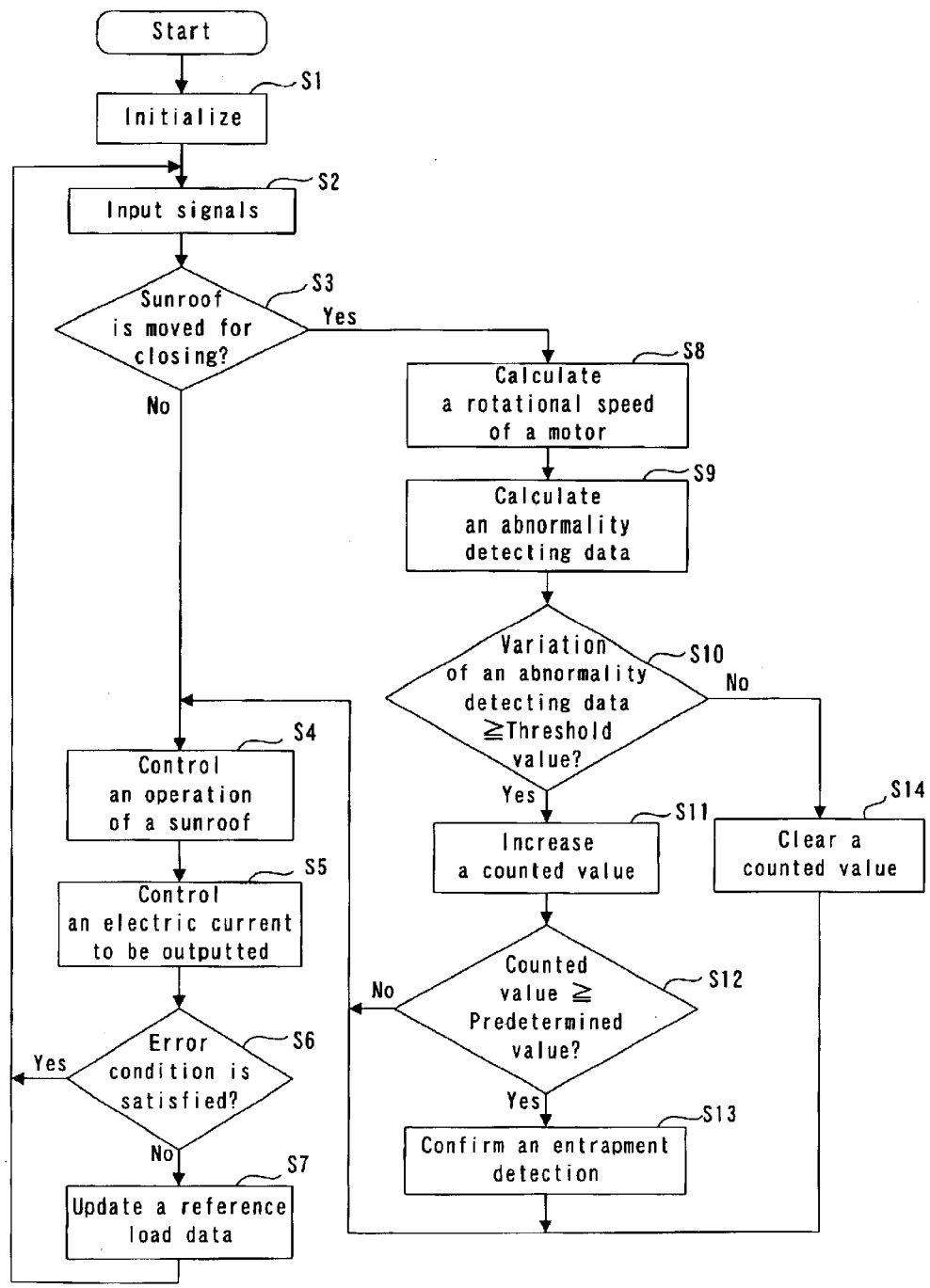
FIG. 5 is a flow chart for explaining a control associated with an entrapment detection according to the embodiment of the present invention.

Next, the control of the entrapment detection by the microcomputer 300 is described hereinbelow with reference to a wave form date graph illustrated in FIG. 4 and a flow chart illustrated in FIG. 5. The wave form data graph explains a reference load data B, a driving data C, and an abnormality detecting data D. A horizontal axis of the graph represents the number of edges of the pulse signal from the entirely open position of the sunroof 2 to the entirely closed position thereof, and a vertical axis thereof represents the rotational speed of the motor 4.

When the electric power is supplied to the microcomputer 300, the microcomputer 300 initially performs the program stored in the ROM. At step S1, the memories in the microcomputer 300 are initialized. For example, data in the microcomputer 300, data in the input/output port, and the value in the counter are initialized. Further, the data stored in the ROM and RAM are checked. The process from step S1 to step S5 is repeatedly performed by a predetermined cycle. In this case, the predetermined cycle is sufficiently short relative to the interval between the edges of the pulse signal outputted from the Hall effect element 11.

At step S2, the microcomputer 300 is inputted with the signal from the operation switch 23, the pulse signal from the Hall effect element 11, and the voltage signal from the power source circuit 20. At step S3, the microcomputer 300 judges whether or not the sunroof 2 is moving in the closing direction. That is, when the sunroof 2 is moving in the opening direction in response to the normal rotational direction of the motor 4, the microcomputer 300 does not perform the judgment of the entrapment, thereby the process advances to step S4. On the other hand, when the sunroof 2 is moving in the closing direction in response to the reverse rotational direction of the motor 4, the microcomputer 300 performs the judgment of the entrapment, thereby the process advances to step S8.

At step S8, the driving data C of the rotational speed C of the motor 4 is detected at a present moment while the sunroof 2 moves for closing. At step S9, the abnormality detecting data D is obtained by eliminating the reference load data B including disturbance from the rotational speed C of the motor 4 at the present moment. The reference load data B represents the load applied to the sunroof 2 when there is no object or obstacle entrapped and is stored in the RAM. According to the embodiment of the present invention, both of the rotational speed C and the reference load data B are denoted with the rotational number so that the abnormality detecting data D is calculated by subtracting the reference load data B from the rotational speed C.

The reference load data B is obtained as described hereinbelow. The microcomputer 300 calculates a rotational number A of the motor 4 while the sunroof 2 has been slidably moved for closing prior to the calculation of the rotational number C at the present moment. In the meantime, the microcomputer 300 calculates a variation of the rotational number A per edge of the pulse signal, i.e. increasing/decreasing amount of the rotational number A of the motor 4, every processing cycle. The variation of the rotational number A is overwritten as the reference load data B in the RAM every time when a predetermined condition is satisfied at step S6. The reference load data B is memorized in an only operational range in which the deflector 6 is assumed to be pushed down by the sunroof 2. The operational range is illustrated as a range from a point E1 of the number of edges to a point E2 thereof in the graph in FIG. 4. The reference load data B in the other operational ranges, such as a range from a zero point of the number of edges to the point E1, and a range possessing the number of edges being greater than the number of edges at the point E2, is defined by a wave form subsuming a substantially constant rotational speed A of the motor 4. Therefore, it is preferable that storage of the RAM is not required to be great enough for storing each reference load data B in each operational range.

After calculating the abnormality detecting data D at step S9, the process advances to step S10, wherein a variation of the abnormality detecting data D per predetermined time (e.g. one cycle of the pulse signal) is judged whether or not to exceed a predetermined threshold value. When the variation of the abnormality detecting data D is substantially equal to or greater than the threshold value, the microcomputer 300 determines the occurrence of the entrapment and the process advances to step S11. On the other hand, when the variation of the abnormality detecting data D is less than the threshold value, the microcomputer 300 determines no occurrence of the entrapment and the process advances to step S14.

At step S14, a counted value representing the counted number of entrapment detections is cleared to zero and the process advances to step S4. At step S11, the counted value of the entrapment detection is added by one. At step S12, the counted value is judged whether or not to be substantially equal to or greater than a predetermined value. When the counted value is substantially equal to or greater than the predetermined value, the process advances to step S13 so as to confirm the entrapment detection and advances to step S4. On the other hand, when the counted value is smaller than the predetermined value, the process advances to step S4 without confirming the entrapment detection. As described above, the counted value is cleared to zero when the occurrence of the entrapment is not detected while the counted value representing the counted number of entrapment detections is still less than the predetermined value. Therefore, the entrapment detection can be confirmed only when the entrapment is successively detected at the counted number being equal to or greater than predetermined value.

When the entrapment detection is confirmed at step S13, the microcomputer 300 sends an off signal to the relay 14 for cutting off electric current applied thereto, thereby terminating the motor 4 from rotating in the reverse direction for moving the sunroof 2 for closing. Further, the microcomputer 300 sets a flag representing the entrapment detection. The RAM stores a signal to be outputted to the relay 14 based upon the set flag so as to rotate the motor 4 for moving the sunroof 2 for opening. At step, S5, the signal is outputted to the relay 14 so as to apply electric current to the relay 14 for rotating the motor 4 for moving the sunroof 2 for opening.

The process further advances to step S6 for judging whether or not an error condition is satisfied. When the error condition is judged to be satisfied, it assumes that extra load due to external causes is applied to the sunroof 2. According to the embodiment of the present invention, the microcomputer 300 judges that the error condition is satisfied when at least one of the following four conditions is satisfied, 1) when an object or an obstacle is entrapped in the opening 1a between the sunroof 2 and the roof 1, (e.g. when load relatively greater than the biasing force applied to the deflector 6 is applied to the sunroof 2 and the rotational speed of the motor 4 becomes equal to or less than the rotational speed immediately when the entrapment occurs, 2) when the driving of the motor 4 is stopped during the sunroof 2 being moved for closing, 3) when the voltage applied to the microcomputer 300 rapidly varies, and 4) when the vehicle speed is equal to or greater than a predetermined vehicle speed. On the other hand, the microcomputer 300 judges that the error condition is not satisfied when none of the four conditions are satisfied. The case that the error condition is not satisfied corresponds to the case that the predetermined condition is satisfied.

When the microcomputer 300 judges that the error condition is not satisfied at step S6, i.e. when the microcomputer 300 judges that the predetermined condition is satisfied at step S6, the process advances to step S7. At step S7, the reference load data B already stored in the RAM is overwritten by the variation of the rotational speed C of the motor 4 per edge of the pulse signal during the closing operation of the sunroof 2 at this time. That is, the variation of the rotational speed C during the closing operation of the sunroof 2 at this time is determined to be a new reference load data B. The reference load data B is updated in the same manner as described above.

Hereinafter, when the motor 4 is always applied with constant voltage, a negative correlation is generated between torque generated by the motor 4 and the rotational speed thereof. That is, when the rotational speed of the motor 4 becomes higher, the torque is decreased. On the other hand, when the rotational speed of the motor 4 becomes lower, the torque is increased. Therefore, the torque variation of the motor 4 can be detected by storing the variation of the rotational speed C of the motor 4. In view of the characteristics between the motor torque and the motor rotational speed, the reference load data B is updated with the load applied to the sunroof 2 when the load due to the external causes is not assumed to have been applied to the sunroof 2, i.e. with the load applied to the sunroof 2 when the sunroof 2 is moved for closing with no entrapment. The updated reference load data B is referred to for use in calculating the abnormality detecting data D for the next operation of the sunroof 2 for closing. When the predetermined condition is satisfied again at the next operation of the sunroof 2 for closing, i.e. when the error condition is not satisfied again at the next operation of the sunroof 2 for closing, the reference load data B is updated again.

As described above, the reference load data B is sequentially updated every time when the predetermined condition is satisfied. Therefore, the occurrence of the entrapment can be properly detected based upon the reference load data B corresponding to the variation of the load applied to the sunroof 2 due to the aging distortion.

On the other hand, when the microcomputer 300 judges that the predetermined condition is not satisfied at step S6, i.e. when the microcomputer 300 judges that the error condition is satisfied at step S6, the process does not advance to step S7, thereby the reference load data is not updated. In this case, the abnormality detecting data D for the next operation of the sunroof 2 for closing is obtained by use of the reference load data B employed for calculating the previous abnormality detecting data D. The abnormality detecting data D is calculated based upon the difference between the reference load data B and the driving data C. That is, the abnormality detecting data D is calculated by eliminating the load applied to the sunroof 2 during the predetermined condition being satisfied. Therefore, the abnormality detecting data D for use in detecting the entrapment is not affected by the variation of the load applied to the sunroof 2 during the predetermined condition being satisfied. Further, the abnormality detecting data D does not vary due to the variation of the load applied to the sunroof 2 as a result of pushing down of the deflector 6 by the sunroof 2. In this case, the abnormality detecting data D is generated with an approximately flat wave form while there is no entrapment between the sunroof 2 and the roof 1. Further, the variation of the abnormality detecting data D will not exceed the threshold value.

According to the embodiment of the present invention, the variation of the motor rotational speed is memorized as the reference load data. Alternatively, the variation of the electric current supplied to the motor 4 can be memorized as the reference load data in substitution for the variation of the motor rotational speed. Further, the reference load data can be obtained by directly detecting the load applied to the sunroof 2.

According to the embodiment of the present invention, the abnormality detecting data is obtained by setting the variation of the motor rotational speed during the predetermined condition being satisfied as the reference load data. Alternatively, the abnormality detecting data can be obtained by setting the motor rotational speed itself during the predetermined condition being satisfied as the reference load data and by calculating the difference between the reference load data and the motor rotational speed at the present time.

According to the embodiment of the present invention, the entrapment is detected when the variation of the abnormality detecting data per predetermined time is equal to or greater than the predetermined threshold value. Alternatively, the occurrence of the entrapment can be detected when a variation of the abnormality detecting data from a reference value exceeds a threshold value. The reference value is represented by the maximum value of the abnormality detecting data. Still alternatively, the occurrence of the entrapment can be detected when the abnormality detecting data itself exceeds a predetermined value.

As described above, according to the embodiment of the present invention, the abnormality detecting data for use in detecting entrapment is not affected by variation of load during the predetermined condition is satisfied. Even if the entrapment detecting device possesses such a structure that load applied to the opening/closing member widely varies while the predetermined condition is satisfied ruing the movement of the opening/closing member for closing the opening, the abnormality detecting data itself does not fluctuation due to the fluctuation of the load under the structure of the opening/closing member and the fixed member.

Further, according to the embodiment of the present invention, there is no need to divide the operational range of the opening/closing member into plural ranges and no need to set the threshold values for the respective ranges for use in determining an occurrence of the entrapment. Further, there is no need to define a range with a relatively high threshold value.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An entrapment detecting device for an opening/closing member comprising:
    a driving means for driving an opening/closing member so as to be moved for opening/closing an opening defined in a fixed member; and
    a controlling means for detecting, on a basis of a driving condition of the driving means, an object entrapment between the fixed member and the opening/closing member while the opening/closing member is moving to close the opening;
    the controlling means:
       memorizing in advance, while a predetermined condition is satisfied, a reference load data corresponding to a load applied to the opening/closing member that is closing the opening;
       calculating, after memorizing the reference load data and during another movement of the opening/closing member in a direction for closing the opening, a driving data representing the driving condition of the driving means;
       calculating an abnormality detecting data by subtracting from the driving data the reference load data memorized in advance; and
       judging, on the basis of the abnormality detecting data, whether an object has been entrapped between the opening/closing member and the fixed member.

2. An entrapment detecting device for an opening/closing member according to claim 1, wherein the controlling means recognizes an occurrence of the entrapment between the opening/closing member and the fixed member when a variation of the abnormality detecting data per predetermined passage of time exceeds a threshold value.

3. An entrapment detecting device for an opening/closing member according to claim 1, wherein the controlling means recognizes an occurrence of the entrapment between the opening/closing member and the fixed member when a variation of the abnormality detecting data from a reference value exceeds a threshold value.

4. An entrapment detecting device for an opening/closing member according to claim 1, wherein the controlling means recognizes an occurrence of the entrapment between the opening/closing member and the fixed member when the abnormality detecting data exceeds a predetermined value.

5. An entrapment detecting device for an opening/closing member according to claim 1, wherein the predetermined condition is satisfied when the controlling means judges that there is no object entrapped between the opening/closing member and the fixed member.

6. An entrapment detecting device for an opening/closing member according to claim 5, wherein the controlling means recognizes an occurrence of the entrapment between the opening/closing member and the fixed member when a variation of the abnormality detecting data per predetermined passage of time exceeds a threshold value.

7. An entrapment detecting device for an opening/closing member according to claim 1, wherein the predetermined condition is satisfied when the driving of the driving means is not stopped while the opening/closing member is moved for closing the opening.

8. An entrapment detecting device for an opening/closing member according to claim 7, wherein the controlling means recognizes an occurrence of the entrapment between the opening/closing member and the fixed member when a variation of the abnormality detecting data from a reference value exceeds a threshold value.

9. An entrapment detecting device for an opening/closing member according to claim 1, wherein the driving means is an electrically driven motor, the driving condition of the driving means is either a rotational speed of the electrically driven motor, a driving torque of the motor, or an electric current supplied to the motor.

10. An entrapment detecting device for an opening/closing member according to claim 9, wherein the controlling means recognizes an occurrence of the entrapment between the opening/closing member and the fixed member when the abnormality detecting data exceeds a predetermined value.

11. An entrapment detecting device for an opening/closing member according to claim 9, comprising:
    a pulse generating means for generating a pulse every predetermined rotation of the motor,
    wherein the controlling means memorizes the reference load data based upon a cycle of the pulse outputted from the pulse generating means.

12. The entrapment detecting device according to claim 1, wherein the abnormality detecting data is a value determined on a basis of a rotational speed of the driving means, and wherein an object entrapment between the opening/closing member and the fixed member is determined by use of a predetermined threshold value.

13. A method of detecting an entrapment for an opening/closing member moved for opening/closing an opening defined in a fixed member comprising:
    judging whether the opening/closing member has moved to close the opening;
    memorizing in advance, when a predetermined condition has been satisfied, a reference load data corresponding to a load applied to the opening/closing member that is closing the opening;
    after memorizing the reference load data and during another movement of the opening/closing member in a direction for closing the opening, calculating a driving data representing a driving condition of the driving means;

calculating an abnormality detecting data by subtracting from the driving data the reference load data memorized in advance; and judging, on a basis of the abnormality detecting data, whether the predetermined condition has been satisfied, wherein, when the predetermined condition is judged to have been satisfied, the reference load data that has been memorized in advance is updated by the driving data.

14. A method of detecting an entrapment for an opening/closing member according to claim 13, further comprising:

judging whether or not a variation of the abnormality detecting data per predetermined time is equal to or greater than a predetermined threshold value, wherein the predetermined condition is judged to be satisfied when the variation of the abnormality detecting data is not judged to be equal to or greater than the predetermined threshold value.

15. A method of detecting an entrapment for an opening/closing member according to claim 14, further comprising:

increasing a counted value representing the counted number of entrapments by one when the variation of the abnormality detecting data is judged to be equal to or greater than the predetermined threshold value;

judging whether or not the counted value is equal to or greater than a predetermined value, and wherein the predetermined condition is judged to be satisfied when the counted value is not judged to be equal to or greater than the predetermined value.

16. The method of detecting an entrapment of an opening/closing member moved for opening/closing an opening defined in a fixed member according to claim 13, wherein the abnormality detecting data is determined on a basis of a rotational speed of the driving means, and wherein an object entrapment between the opening/closing member and the fixed member is determined by use of a predetermined threshold value.

* * * * *